(12) United States Patent
Zhai et al.

(10) Patent No.: US 9,713,854 B2
(45) Date of Patent: Jul. 25, 2017

(54) SYSTEM AND METHOD OF FRICTION WELDING A WORKPIECE

(71) Applicant: ArvinMeritor Technology, LLC, Troy, MI (US)

(72) Inventors: Yang Zhai, Rochester Hills, MI (US); John Kelly, Grosse Pointe Farms, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 553 days.

(21) Appl. No.: 14/284,441

(22) Filed: May 22, 2014

(65) Prior Publication Data

US 2015/0336203 A1    Nov. 26, 2015

(51) Int. Cl.

| | | |
|---|---|---|
| *B23K 20/00* | (2006.01) | |
| *B23K 37/00* | (2006.01) | |
| *B21J 5/00* | (2006.01) | |
| *B21K 25/00* | (2006.01) | |
| *B29C 65/00* | (2006.01) | |
| *B23K 20/12* | (2006.01) | |
| *B29C 65/06* | (2006.01) | |
| *B21J 5/06* | (2006.01) | |
| *B23K 37/06* | (2006.01) | |
| *B29L 23/00* | (2006.01) | |
| *B23K 101/06* | (2006.01) | |

(52) U.S. Cl.
CPC .............. *B23K 20/12* (2013.01); *B21J 5/063* (2013.01); *B21K 25/005* (2013.01); *B23K 20/129* (2013.01); *B23K 37/06* (2013.01); *B29C 65/06* (2013.01); *B29C 65/0681* (2013.01); *B23K 2201/06* (2013.01); *B29L 2023/22* (2013.01); *Y10T 156/1744* (2015.01)

(58) Field of Classification Search
CPC ........ B23K 20/00; B23K 20/10; B23K 20/12; B23K 20/129; B23K 37/00; B23K 37/06; B21J 5/00; B21J 5/06; B21J 5/06; B21J 5/063; B21K 25/00; B21K 25/005; B29C 65/00; B29C 65/06; B29C 65/06; B29C 65/068; B29C 65/068; B29C 65/0681
See application file for complete search history.

(56) References Cited

U.S. PATENT DOCUMENTS

| | | | |
|---|---|---|---|
| 3,444,611 A | | 5/1969 | Bogart |
| 4,768,839 A | * | 9/1988 | Spindler .............. B23K 20/129 301/124.1 |

(Continued)

FOREIGN PATENT DOCUMENTS

| | | |
|---|---|---|
| EP | 1354662 A1 | 10/2003 |
| FR | 2096924 A1 | 3/1972 |
| JP | 2010155265 A | 7/2010 |

OTHER PUBLICATIONS

European Patent Office, Extended European Search Report for the corresponding European Patent Application No. 15166030.5 dated Dec. 1, 2015.

*Primary Examiner* — Michael N Orlando
*Assistant Examiner* — Matthew Hoover
(74) *Attorney, Agent, or Firm* — Brooks Kushman P.C.

(57) ABSTRACT

A system and method of friction welding a workpiece. A curl forming die may be disposed proximate a first part and a second part. The curl forming die may form a curl that is generated when the first part is friction welded to the second part.

18 Claims, 4 Drawing Sheets

(56) References Cited

U.S. PATENT DOCUMENTS 5,211,100 A 5/1993 Fuller et al.
2003/0197047 A1* 10/2003 Kanzaki ................ B23K 20/12
228/2.1

* cited by examiner

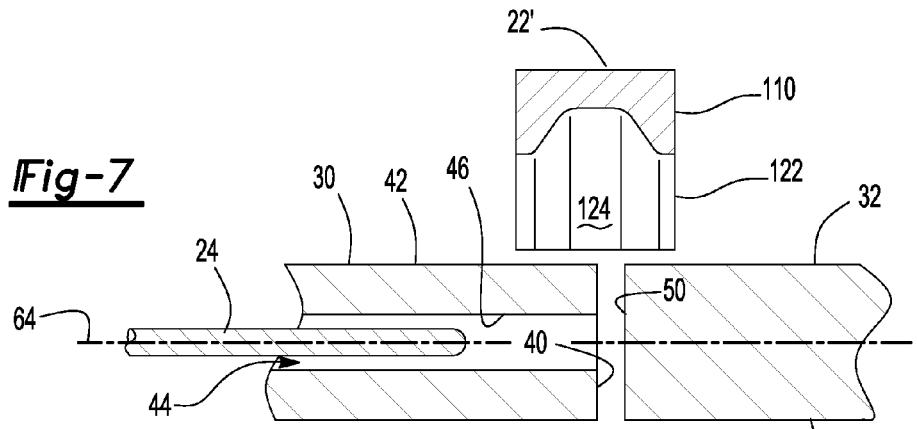
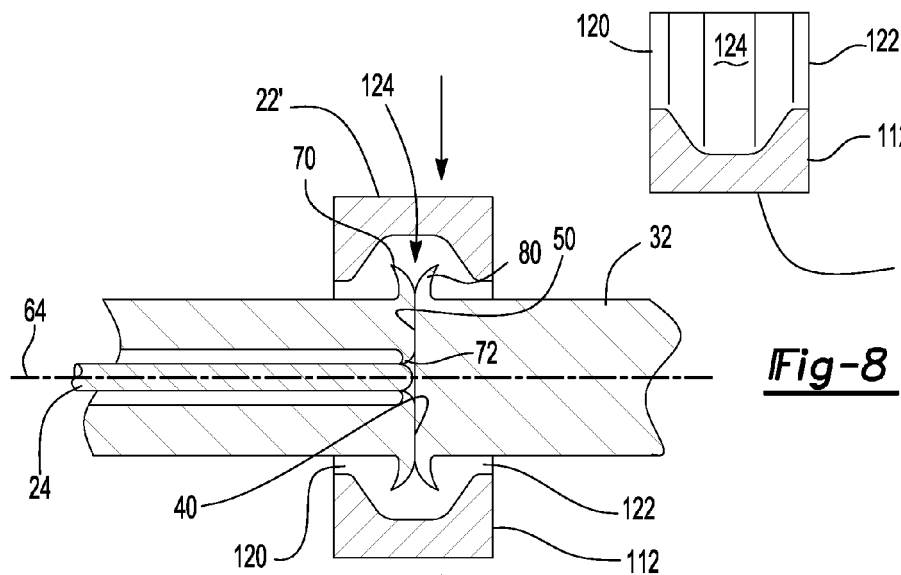
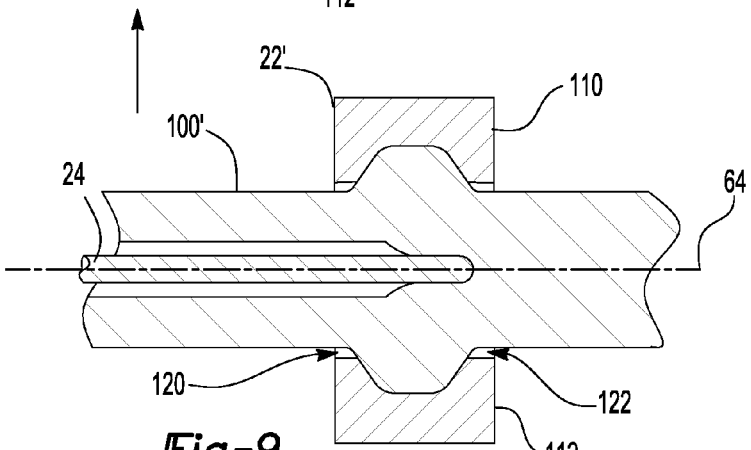

US 9,713,854 B2

SYSTEM AND METHOD OF FRICTION WELDING A WORKPIECE

TECHNICAL FIELD

This patent application relates to a system and method of friction welding a workpiece.

BACKGROUND

A friction welded cylinder is disclosed in U.S. Pat. No. 5,211,100.

SUMMARY

In at least one embodiment, a method of friction welding a workpiece is provided. The method may positioning a curl forming die proximate a first part and a second part. The first part may be friction welded to the second part, such that a first curl is generated proximate the first part and a second curl is generated proximate the second part. The first curl and the second curl may be formed by the curl forming die during friction welding.

In at least one embodiment, a method of friction welding a workpiece is provided. The method may include providing a first part that has a first hole and a second part. A first curl forming die may be positioned proximate the first part and the second part. A second curl forming die may be positioned inside at least one of the first part and the second part. The first part may be friction welded to the second part such that a first external curl and a first internal curl are generated from the first part and a second external curl is generated from the second part. The first external curl and the second external curl may be formed by the first curl forming die. The first internal curl may be formed by the second curl forming die.

In at least one embodiment, a system for a friction welding a workpiece is provided. The system may include a friction welder and a first curl forming die. The friction welder may receive a first part and a second apart and may rotate the first part about an axis to friction weld the first part to the second part and generate a first external curl from the first part and a second external curl from the second part. The first curl forming die may extend around the first external curl and the second external curl. The first external curl and the second external curl may engage the first curl forming die to force the first external curl and the second external curl against the first part in the second part, respectively.

BRIEF DESCRIPTION OF THE DRAWINGS

FIGS. 6-9 illustrate a second example of friction welding of a workpiece.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
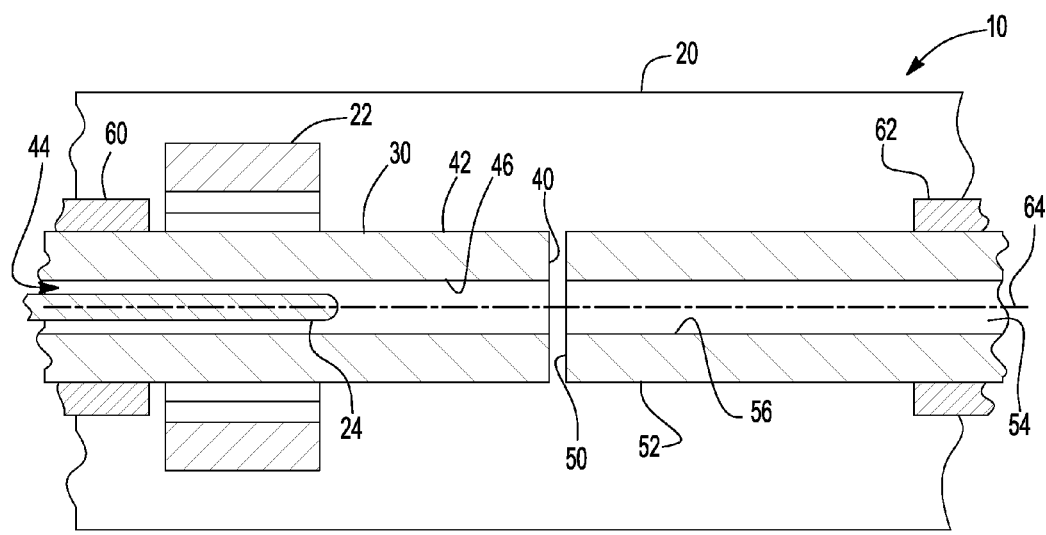
FIGS. 1-5 illustrate a first example of friction welding of a workpiece.

Referring to FIG. 1, an exemplary system 10 for a friction welding a workpiece is shown. The workpiece may be a component that may be provided with a motor vehicle like a truck, bus, farm equipment, military transport or weaponry vehicle, or cargo loading equipment for land, air, or marine vessels. In at least one embodiment, system 10 may include a friction welder 20, a first curl forming die 22, and a second curl forming die 24.

The friction welder 20 may be configured to friction weld a first part 30 and a second part 32 together. The first part 30 and the second part 32 may have any suitable configuration. In FIG. 1, the first part 30 and the second part 32 are both shown with a tubular configuration. As such, the first part 30 may have an end surface 40, a first external surface 42, a first hole 44, and a first internal surface 46 that may at least partially define the first hole 44. Similarly, the second part 32 may have an end surface 50, a second external surface 52, a second hole 54, and a second internal surface 56 that may at least partially define the second hole 54. The first hole 44 and first internal surface 46 and/or the second hole 54 and second internal surface 56 may be omitted in one or more embodiments. The first part 30 and the second part 32 may be made of any suitable material or materials that may be friction welded together. For example, the first part 30 and the second part 32 may be made of a metal, metal alloy, polymeric material, or carbon fiber in one or more embodiments.

The friction welder 20 may have a first fixture 60 that may receive the first part 30 and a second fixture 62 that may receive the second part 32. The first fixture 60 and the second fixture 62 may position the first part 30 and the second part 32 along an axis 64. The first fixture 60 may facilitate movement the first part 30 with respect to the second part 32, such as by rotating the first part 30 about an axis 64 while the second fixture 62 holds the second part 32 in a stationary position. Alternatively, the second fixture 62 may facilitate movement of the second part 32 with respect to the first part 30, such as by rotating the second part 32 about the axis 64 while the first fixture 60 holds the first part 30 in a stationary position. As another option, the first part 30 and the second part 32 may both move or rotate about the axis 64 at different velocities. The first fixture 60 and/or the second fixture 62 may also be configured to move the first part 30 and or the second part 32 axially or along the axis 64 to apply and axial load to facilitate friction welding.

During friction welding, the first part 30 and the second part 32 may be engaged to generate heat through mechanical friction between the first part 30 and the second part 32. For example, the end surface 40 of the first part 30 may be placed in engagement with the end surface 50 of the second part 32, thereby generating frictional heat. Frictional heating may be supplemented by non-frictional heating. For example, the first part 30 and/or second part 32 may be heated with induction heating, resistance heating, or an external heat source.

Figure 2:
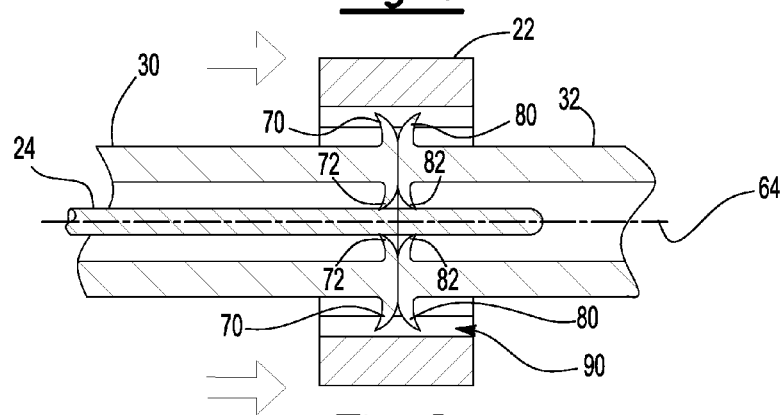

During friction welding, a lateral force or axial load may be imparted on the first part 30 and/or the second part 32 to plastically displace and fuse the first part 30 and the second part 32 together. The lateral force or axial load may force the first part 30 toward the second part 32 or vice versa. The lateral force or axial load may generate one or more curls on the first part 30 and the second part 32. For example, as shown in FIG. 2, a first external curl 70 and a first internal curl 72 may be generated from the first part 30 while a second external curl 80 and a second internal curl 82 may be generated from the second part 32. The first internal curl 72 may be disposed in the first hole 44 while the second internal curl 82 may be disposed in the second hole 54. The first internal curl 72 may not be generated when the first part 30 does not include the first hole 44. Similarly, the second internal curl 82 may not be generated when the second part 32 does not include the second hole 54. The first external curl 70 and the first internal curl 72 may extend away or curl away from the second part 32. The second external curl 80 and the second internal curl 82 may extend away or curl away from the first part 30.

The first external curl 70 and the second external curl 80 may extend in a continuous ring about the axis 64. In addition, the first external curl 70 may be spaced apart from the first external surface 42 and the second external curl 80 may be spaced apart from the second external surface 52 prior to being formed by the first curl forming die 22. Similarly, the first internal curl 72 and the second internal curl 82 may extend in a continuous ring about the axis 64. The first internal curl 72 may be spaced apart from the first internal surface 46 and the second internal curl 82 may be spaced apart from the second internal surface 56 prior to being formed by the second curl forming die 24. The amount of material displaced and the size of the curls may increase as friction welding progresses from the configuration shown in FIG. 2.

The first curl forming die 22 may be configured to form the first external curl 70 and the second external curl 80. In at least one embodiment, the first curl forming die 22 may be positioned to extend continuously around the first part 30 and the second part 32 before friction welding and may extend around the first part 30, the second part 32, the first external curl 70, and the second external curl 80 during friction welding or when friction welding is complete.

The first curl forming die 22 may define a cavity 90 that may receive the first part 30, the second part 32, the first external curl 70, and the second external curl 80. The cavity 90 may extend around the first part 30 and the second part 32 such that the first curl forming die 22 is completely spaced apart from the first part 30 and second part 32 before friction welding. The cavity 90 may be provided in various configurations. For example, the cavity 90 may have a generally constant size or diameter, notwithstanding a slight taper that may be provided to facilitate disengagement of the first curl forming die 22 from the workpiece after friction welding. Alternatively, the first curl forming die may be configured with a cavity having a non-constant size or non-constant diameter. In such a configuration, the first curl forming die 22 may form the first external curl 70 and the second external curl 80 into one or more features 92 such as protrusions like ribs, splines, or threads and/or indentations such as grooves or channels. The first curl forming die 22 may have a unitary one-piece construction or a multipiece construction and may or may not move axially with respect to the workpiece as will be discussed in more detail below.

The second curl forming die 24 may be configured to form the first internal curl 72 and/or the second internal curl 82. In at least one embodiment, the second curl forming die 24 may be positioned inside the first hole 44 and/or the second hole 54 and may extend along and may move along the axis 64. As such, the second curl forming die 24 may be disposed inside and may be spaced apart from the first part 30 and the second part 32 before friction welding.

The second curl forming die 24 may be provided in various configurations. For example, the second curl forming die 24 may be configured as a rod that may have a generally constant size or diameter, notwithstanding a slight taper that may be provided to facilitate disengagement of the second curl forming die 24 from the workpiece after friction welding. Alternatively, the second curl forming die 24 may have a non-constant size or non-constant diameter that may allow the second curl forming die 24 to form the first internal curl 72 and the second internal curl 82 into features such as such as protrusions like ribs, splines, or threads and/or indentations such as grooves or channels.

Referring to FIGS. 1-5, a method of friction welding a workpiece from a first part 30 and a second part 32 that have holes is shown.

In FIG. 1, the first part 30 is received in a first fixture 60 of the friction welder 20 and the second part is 32 received in a second fixture 62 of the friction welder 20. Initially, the first part 30 may be spaced apart from the second part 32 until the first part 30 and/or second part 32 before at least one of the parts achieves a target rotational velocity. The first curl forming die 22 and the second curl forming die 24 are shown in exemplary initial positions. For example, the first curl forming die 22 may be axially displaced from the second part 32 such that the first curl forming die 22 may not extend around the first part 30 and the second part 32 when in the initial position. Similarly, the second curl forming die 24 may be axially displaced from the second part 32 such that the second curl forming die 24 may not be disposed in the second hole 54 of the second part 32.

In FIG. 2, the first curl forming die 22 and the second curl forming die 24 are actuated from their respective initial positions to corresponding forming positions. For example, the first curl forming die 22 and the second curl forming die 24 may move axially or along the axis 64 from their respective initial positions to their respective forming positions. The first curl forming die 24 may extend around the first part 30 and the second part 32 when in the forming position. The second curl forming die 24 may be disposed in or extend into the first hole 44 and the second hole 54 when in the forming position.

Once the first curl forming die 22 and the second curl forming die 24 are in their respective forming positions, the first part 30 and the second part 32 may be engaged. As such, the end surface 40 of the first part 30 may engage the end surface 50 of the second part 32. The first part 30 and the second part 32 may be engaged by moving the first part 30 toward the second part 32, moving the second part 32 toward the first part 30, or by moving the first part 30 and the second part 32 toward each other. The heating of the first part 30 and the second part 32 along with the applied lateral force or axial load may then generate the first external curl 70, first internal curl 72, second external curl 80 and second internal curl 82 as previously discussed. The first external curl 70 and second external curl 80 may progressively increase in size and extend toward and eventually engage the first curl forming die 22 while the first internal curl 72 and the second internal curl 82 may progressively increase in size and extend toward and eventually engage the second curl forming die 24. Optionally, the first and second external curls 70, 80 or the first and second internal curls 72, 82 may not be formed if the first and second curl forming dies 22, 24 are not provided.

Figure 3:
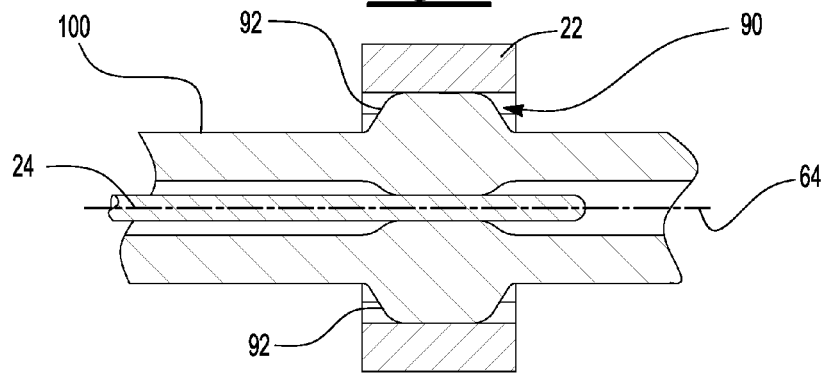

In FIG. 3, the workpiece 100 is shown after friction welding is complete. The first and second external curls 70, 80 have engaged and been formed by the first curl forming die 22. Similarly, the first and second internal curls 72, 82 have engaged and been formed by the second curl forming die 24. Forming of the first and second external curls 70, 80 may form or force the first and second external curls 70, 80 back against the first and second external surfaces 42, 52, respectively, thereby causing the first and second external curls 70, 80 to at least partially fill the cavity 90. Moreover, the first and second external curls 70, 80 may then be fused or forged together with the first and second parts 30, 32 to form an enlarged region such that first and second external curls 70, 80 and the first and second parts 30, 32 may be a single fused mass that may be free of voids. Forming of the first and second internal curls 72, 82 may form or force the first and second internal curls 72, 82 back against the first and second internal surfaces 46, 56, respectively, thereby causing the first and second internal curls 72, 82 to form around the second curl forming die 24 and at least partially fill the gap that was previously present between the second curl forming die 24 and the first and second parts 30, 32. As such, the first and second internal curls 72, 82 may be fused or forged together with the first and second parts 30, 32 to form an enlarged region in the first and second holes 44, 54 such that first and second internal curls 72, 82 and the first and second parts 30, 32 may be a single fused mass that may be free of voids.

Figure 4:
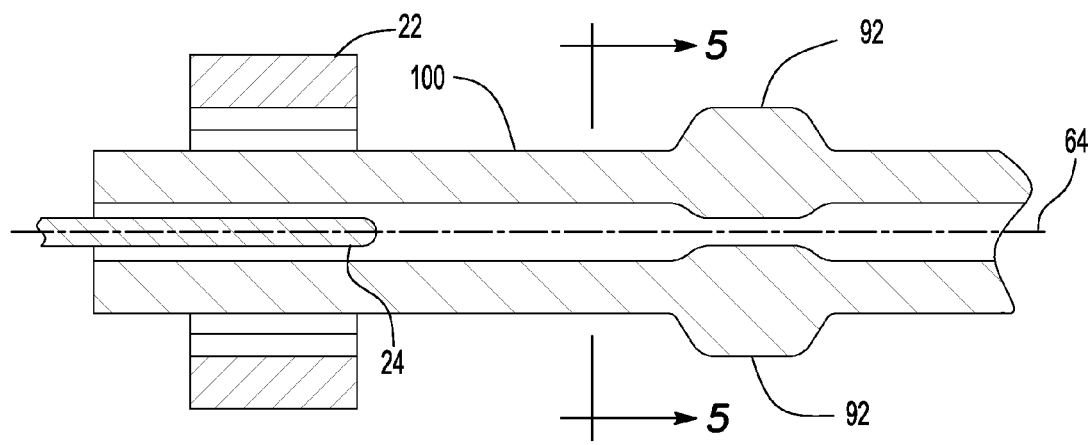

In FIG. 4, the first curl forming die 22 and the second curl forming die 24 may be actuated from their forming positions back to their initial positions to facilitate removal of the workpiece 100.

Figure 5:
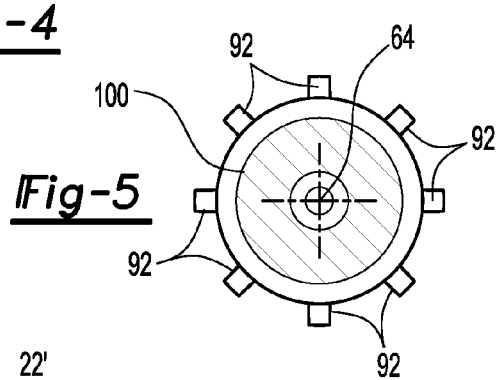

In FIG. 5, a section view of the workpiece 100 is shown to further illustrate examples of features 92 such as protrusions like ribs, splines, or threads and/or indentations such as grooves or channels that may be provided by forming one or more curls, such as by providing such features in relief on the first curl forming die 22. In FIG. 5, the features 92 are illustrated as being spaced apart from and disposed further from the axis 64 than the initial configuration of the first and second external surfaces 42, 52; however, it is contemplated that each feature 92 could extend outwardly starting at or proximate the first and second external surfaces 42, 52. Similarly, features 92 may be formed from the first and second internal curls 72, 82 that may initiate proximate the initial configuration of the first and second internal surfaces 46, 56 or may be initiate further from the axis 64 than the initial configuration of the first and second internal surfaces 46, 56.

Referring to FIGS. 6-9, another example of friction welding a workpiece is shown. In this embodiment, the first part 30 is provided with a first hole 44 while the second part 32 is not provided with a hole to illustrate curl forming when one hole is provided. In addition, the first curl forming die 22' has a different cavity formation to illustrate curl forming when the first curl forming die is inhibited from moving axially. It is contemplated that the second part 32 provided with a second hole as previously discussed or that the first curl forming die 22' may be utilized with first and second parts 30, 32 as depicted in FIGS. 1-5.

Figure 6:
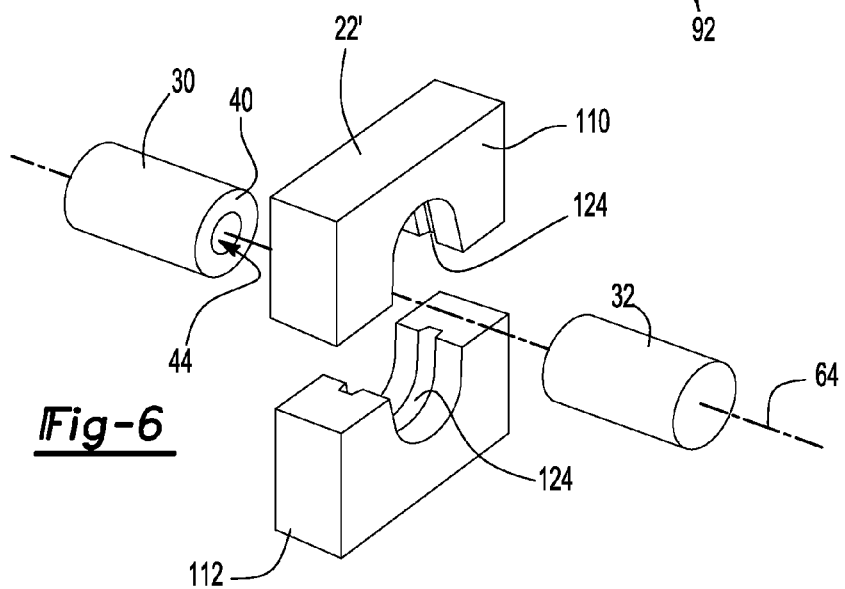

In FIGS. 6 and 7, the first curl forming die 22' has a different configuration than in FIGS. 1-5, but may again facilitate forming of the external curls. The first part 30 may be received in a first fixture 60 of the friction welder 20 and the second part is 32 may be received in a second fixture 62 of the friction welder 20. Initially, the first part 30 may be spaced apart from the second part 32 until the first part 30 and/or second part 32 before at least one of the parts achieves a target rotational velocity. In FIG. 7, the first curl forming die 22' and the second curl forming die 24 are shown in exemplary initial positions. For example, the first curl forming die 22' may have a first die portion 110 and a second die portion 112 that may be disposed opposite each other and may be spaced apart from each other when in the initial position and may be positioned adjacent to each other during friction welding. The first die portion 110 may have a first opening 120 that may receive the first part 30. The second die portion 112 may have a second opening 122 that may receive the second part 32. The first and second die portions 110, 112 may cooperate to define an enlarged cavity 124. The cavity 124 may be disposed further from the axis 64 than the first opening 120 and the second opening 122. The second curl forming die 24 may be axially displaced from the second part 32.

In FIG. 8, the first curl forming die 22 and the second forming die 24 are shown in their respective forming positions. For example, the first die portion 110 and/or the second die portion 112 may move toward the axis 64 such that the first die portion 110 engages the second die portion 112 to extend continuously around the first and second parts 30, 32 when in the forming position. The second curl forming die 24 may be disposed in or extend into the first hole 44 and may be disposed proximate the end surface 50 of the second part 32 when in its forming position.

Once the first curl forming die 22 and the second curl forming die 24 are in their respective forming positions, the first part 30 and the second part 32 may be engaged under an axial load to generate the first external curl 70, first internal curl 72, and second external curl 80 and friction weld the first part 30 to the second part 32 as previously discussed. The first external curl 70 and second external curl 80 may progressively increase in size and extend toward and eventually engage the first die portion 110 and second die portion 112 while the first internal curl 72 may progressively increase in size and extend toward and eventually engage the second curl forming die 24.

In FIG. 9, the workpiece 100' is shown after friction welding is complete. The first and second external curls 70, 80 have engaged and been formed by the first and second die portions 110, 112 of the first curl forming die 22. Similarly, the first internal curl 72 has engaged and been formed by the second curl forming die 24. Forming of the first and second external curls 70, 80 may form or force the first and second external curls 70, 80 back against the first and second external surfaces 42, 52, respectively, thereby causing the first and second external curls 70, 80 to at least partially fill the cavity 124. Moreover, the first and second external curls 70, 80 may then be fused or forged together with the first and second parts 30, 32 to form an enlarged region such that first and second external curls 70, 80 and the first and second parts 30, 32 may be a single fused mass that may be free of voids. Forming of the first internal curl 72 may form or force the first and second internal curls 72, 82 against the end surface 50 of the second part 32 and back against the first internal surface 46, thereby causing the first internal curl 72 to form around the second curl forming die 24 and at least partially fill the gap that was previously present between the second curl forming die 24 and the first and second parts 30, 32. As such, the first internal curl 72 may be fused or forged together with the first and second parts 30, 32 to form an enlarged region in the first hole 44 such that first internal curls 72 and the first and second parts 30, 32 may be a single fused mass that may be free of voids.

The first curl forming die 22 and the second curl forming die 24 may be actuated from their forming positions back to their initial positions to facilitate removal of the workpiece 100' after friction welding is complete.

Figure 10:
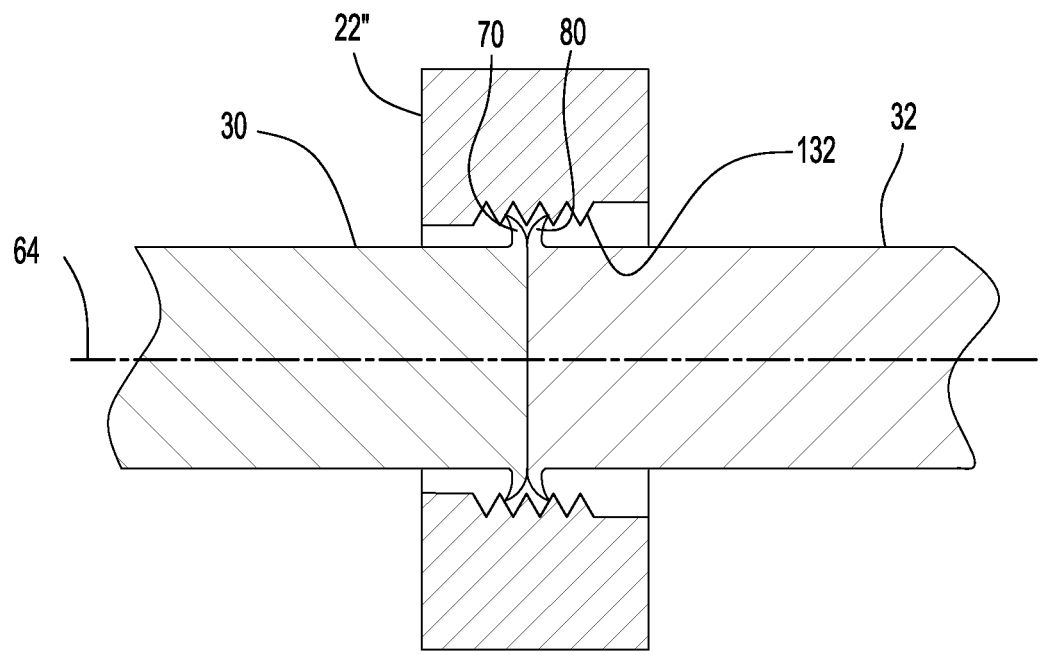
FIGS. 10 and 11 illustrate a third example of friction welding of a workpiece.
Figure 11:
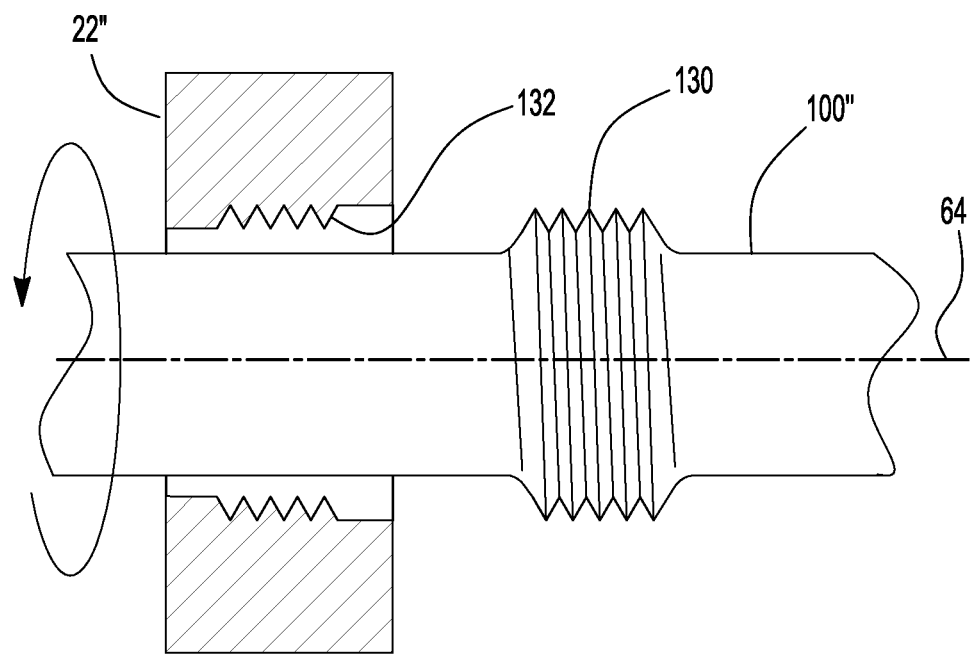

Referring to FIGS. 10 and 11, another example of friction welding a workpiece 100" is shown. In this embodiment, the first curl forming die 22" is configured to form the first external curl 70 and the second external curl 80 into a thread or threaded region that may extend around the workpiece 100".

As shown in FIG. 10, the first curl forming die 22" may extend around the first and second parts 30, 32 and may be provided with a cavity surface 132 that may define one or more threads 130. The cavity surface 132 may be spaced apart from the first part 30 and the second part 32 before friction welding.

The first part 30 and the second part 32 may be engaged under an axial load to generate the first and second external curls 70, 80 and friction weld the first part 30 to the second part 32. The first and second external curl 70, 80 and second external curl 80 may progressively increase in size and extend toward and eventually engage the cavity surface 132, which may form the thread 130 and force the first and second external curls 70, 80 back against the first and second external surfaces 42, 52, respectively, thereby causing the first and second external curls 70, 80 to at least partially fill the cavity 124 and form a single fused mass that may be free of voids.

Referring to FIG. 11, the workpiece 100" may be removed from the first curl forming die 22" by rotating the workpiece 100" about the axis 64 to unthread the workpiece 100" from the first curl forming die 22", by rotating the first curl forming die 22" about the axis 64 to unthread the first curl forming die 22" from the workpiece 100", or by separating the first curl forming die 22" if it is configured with first and second die portions similar to that shown in FIGS. 6-9. Optionally, it is contemplated that one or more internal threads may be formed by a second curl forming die 24 that may have a threaded exterior surface and that may be inserted into a hole in the first part 30 and/or a hole in the second part 32.

The system and method described above may allow a workpiece to be provided without cutting or mechanically separating external curls and/or internal curls from a friction welded workpiece, thereby reducing material scrap, cycle time, and associated costs. Moreover, forming the external curls and/or internal curls into a single solid mass may provide increase the size of the friction weld and increase the strength and/or durability of the friction welded workpiece. In addition, features such as threads, splines, indentations, and protrusions may be provided during friction welding rather than with subsequent manufacturing steps, thereby reducing associated costs and material handling.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of friction welding a workpiece comprising:
   positioning a curl forming die proximate first and second parts that are disposed along an axis, the curl forming die including a first die portion and a second die portion that is disposed opposite the first die portion, wherein the first die portion has a first opening that receives the first part, the second die portion has a second opening that receives the second part, and the first and second die portions cooperate to define a cavity; and
   friction welding the first part to the second part such that a first curl is generated proximate the first part and a second curl is generated proximate the second part, wherein the first curl and the second curl are formed by the curl forming die during friction welding, the cavity receives the first part, the second part, the first curl, and the second curl, and the cavity is disposed further from the axis than the first opening and the second opening.

2. The method of claim 1 wherein the curl forming die extends continuously around the first part, the second part, the first curl, and the second curl.

3. The method of claim 1 wherein the first part is friction welded to the second part by rotating at least one of the first part and the second part about the axis.

4. The method of claim 3 wherein positioning the curl forming die includes moving the curl forming die from an initial position to a forming position in which the curl forming die extends around the first part and the second part before friction welding the first part to the second part.

5. The method of claim 4 further comprising moving the curl forming die from the forming position to the initial position after friction welding the first part to the second part.

6. The method of claim 3 wherein the curl forming die forms the first curl and the second curl into a plurality of splines that extend substantially parallel to the axis.

7. A method of friction welding a workpiece comprising:
   positioning a curl forming die proximate a first part and a second part; and
   friction welding the first part to the second part such that a first curl is generated proximate the first part and a second curl is generated proximate the second part, wherein the first curl and the second curl are formed by the curl forming die during friction welding into a thread that extends around the workpiece and the curl forming die is rotated about an axis to unthread the curl forming die from the thread after friction welding the first part to the second part.

8. The method of claim 1 wherein the curl forming die forms the first curl and the second curl into a thread that extends around the workpiece.

9. The method of claim 1 wherein the first die portion is spaced apart from the first part and the second part before the first curl and the second curl are generated.

10. The method of claim 1 wherein the second die portion is spaced apart from the first part and the second part before the first curl and the second curl are generated.

11. A method of friction welding a workpiece comprising:
    providing a first part that has a first hole and a second part;
    positioning a first curl forming die proximate the first part and the second part;
    positioning a second curl forming die inside at least one of the first part and the second part; and
    friction welding the first part to the second part such that a first external curl and a first internal curl are generated from the first part and a second external curl is generated from the second part, wherein the first external curl and the second external curl are formed by the first curl forming die and the first internal curl is formed by the second curl forming die.

12. The method of claim 11 wherein the second curl forming die is inserted into the first hole and is disposed proximate an end surface of the second part that is disposed adjacent to the first part before the first part is friction welded to the second part.

13. The method of claim 12 wherein the second curl forming die is a rod that is spaced apart from the first part before friction welding the first part to the second part.

14. The method of claim 11 wherein the second part defines a second hole, wherein the second curl forming die is inserted into the first hole and the second hole before friction welding the first part to the second part.

15. The method of claim 14 wherein a second internal curl is generated from the second part when the first part is friction welded to the second part, wherein the first internal curl and the second internal curl are formed by the second curl forming die.

16. The method of claim 15 wherein the second curl forming die is spaced apart from the first part and the second part before the first part is friction welded to the second part.

17. The method of claim 1 further comprising a second curl forming die that is disposed inside the first part and that forces an internal curl from the first part against the first part.

18. The method of claim 17 wherein the second curl forming die is disposed inside the second part and forces an internal curl from the second part against the second part.

* * * * *